United States Patent

Ross et al.

[11] Patent Number: 6,057,924
[45] Date of Patent: May 2, 2000

[54] OPTICAL SYSTEM FOR MEASURING AND INSPECTING PARTIALLY TRANSPARENT SUBSTRATES

[75] Inventors: Robert A. Ross, Charlottesville; Stephen H. Jones, Afton, both of Va.

[73] Assignee: Virginia Semiconductor, Inc., Fredericksburg, Va.

[21] Appl. No.: 09/148,278

[22] Filed: Sep. 4, 1998

Related U.S. Application Data

[62] Division of application No. 08/643,169, May 3, 1996, Pat. No. 5,754,294.

[51] Int. Cl.[7] .................................................. G01B 11/06
[52] U.S. Cl. ........................................ 356/381; 356/357
[58] Field of Search ..................................... 356/381, 351, 356/357

[56] References Cited

U.S. PATENT DOCUMENTS 5,403,433   4/1995   Morrison et al. ...................... 356/381

*Primary Examiner*—Robert H. Kim
*Attorney, Agent, or Firm*—Fish & Richardson P.C.

[57] ABSTRACT

Techniques and systems for obtaining the thickness map of a partially transparent substrate in a nondestructive optical fashion. The thickness is determined by comparing the amount of absorption by the substrate to a calibrated amount obtained from a substrate standard with a known thickness that is formed of the same material. Digital signal processing operations are performed to reduce noise and to improve resolution of the thickness map.

14 Claims, 6 Drawing Sheets

OPTICAL SYSTEM FOR MEASURING AND INSPECTING PARTIALLY TRANSPARENT SUBSTRATES

This application includes common subject matter to U.S. patent application Ser. No. 08/960,301, filed on Oct. 29, 1997 which is a divisional application of U.S. patent application Ser. No. 08/643,169, filed on May 3, 1996 and issued on May 19, 1998 as U.S. Pat. No. 5,754,294.

FIELD OF THE INVENTION

The present invention relates to characterization of aspects of substrates, and more specifically, to optical systems and techniques for measuring and inspecting partially transparent semiconductor substrates.

BACKGROUND

Semiconductor substrates are widely used for fabricating a variety of semiconductor-based components and devices including electronic devices, microelectromechanical devices, and opto-microelectronic devices. Better measuring and characterizing substrate properties can improve the yield and the performance of semiconductor devices and circuits. Substrate characterization can be further used to facilitate research and development in semiconductor substrate materials and devices.

One critical area of semiconductor characterization is substrate evaluation and specification of substrate absolute thickness, thickness uniformity, or micro features formed in a substrate. Such information is essential to failure analysis and evaluation of device performance. There has been continuous effort in developing various reliable and fast techniques of substrate characterization, especially, nondestructive measuring techniques and systems that can work with ultra-thin wafers (e.g., 1 $\mu$m~100 $\mu$m in thickness).

SUMMARY

The present disclosure describes optical systems and techniques for measuring and inspecting partially transparent substrates. The thickness and thickness variation of a substrate can be correlated to optical absorption of a monochromatic optical beam at a specified wavelength by the substrate. Specifically, the thickness and thickness variation of a substrate area illuminated by the optical beam can be determined by measuring the transmission profile of the beam. An image of the illuminated substrate area can also be obtained based on the transmission profile for inspection and measurements.

One embodiment of such an optical system includes a sample holder having a support surface for holding a partially transparent substrate, a light source, disposed relative to the sample holder and configured to produce a substantially monochromatic probe beam at one or more discrete wavelengths to illuminate the surface of the substrate, a light sensing array having a plurality of light sensing elements to receive the transmitted probe beam and produce an electrical signal, and an electronic processing device which determines an amount of light absorption by the substrate based on the electrical signal and thereby produces thickness information and an image of the illuminated substrate area.

The probe beam is preferably a substantially incoherent beam to reduce an interference effect caused by the reflection from the substrate surfaces. When a coherent light source (e.g., a laser) is used, a phase scrambling device can be used to randomize the phase of the wavefront of the probe beam so that the probe beam at the substrate is essentially incoherent.

The electrical signal produced by the light sensing array is digitized and processed by the electronic processing device by using digital signal processing techniques. In one implementation, digital spatial filtering and frequency filtering are performed to reduce noise and artifacts in the received signal and to enhance the contrast and resolution of the image of the substrate. A digital scaling process can also performed to remove the spatial variation in the intensity of the probe beam. Furthermore, digital frame averaging and resizing can be implemented.

The thickness distribution of a selected substrate area is correlated to the received signal by a polynomial fitting. The polynomial coefficients can be determined by measurements of optical attenuation of substrate standards with known thickness values.

Different wavelengths and power levels of the probe beam can be used to accommodate the dynamic range of the light sensing array in measuring different thickness values. This can also improve the contrast and the signal-to-noise ratio in the generated thickness maps.

In particular, a system according to the present invention is capable of viewing and measuring processed microstructures such as membrane windows etched in thin substrates. This system provides a fast, nondestructive, accurate, and operator-insensitive method for measuring a wide range of substrates or micro machined substrates with thickness ranging from sub-micron to about 1000 $\mu$m.

These and other embodiments, aspects and advantages of the invention will become more apparent in light of the following detailed description, including the accompanying drawings and appended claims.

DESCRIPTION OF THE PREFERRED EMBODIMENTS

Various aspects of the present invention are embedded in hardware configurations of an optical system for obtaining optical absorption data of a substrate, digital signal processing techniques for accurately and reliably extracting thickness information of the is substrate, and a user interface of a microprocessor-based controller for controlling the system operation and performing the data processing. Preferred embodiments of these aspects of the invention will be described with specific reference to inspecting and measuring semiconductor substrates based on absorption of visible and/or infrared optical radiation. However, inspecting and measuring partially transparent substrates formed by any other material based on absorption of electromagnetic radiation in any other suitable spectral range is implied.

1. System Configurations

Figure 1:
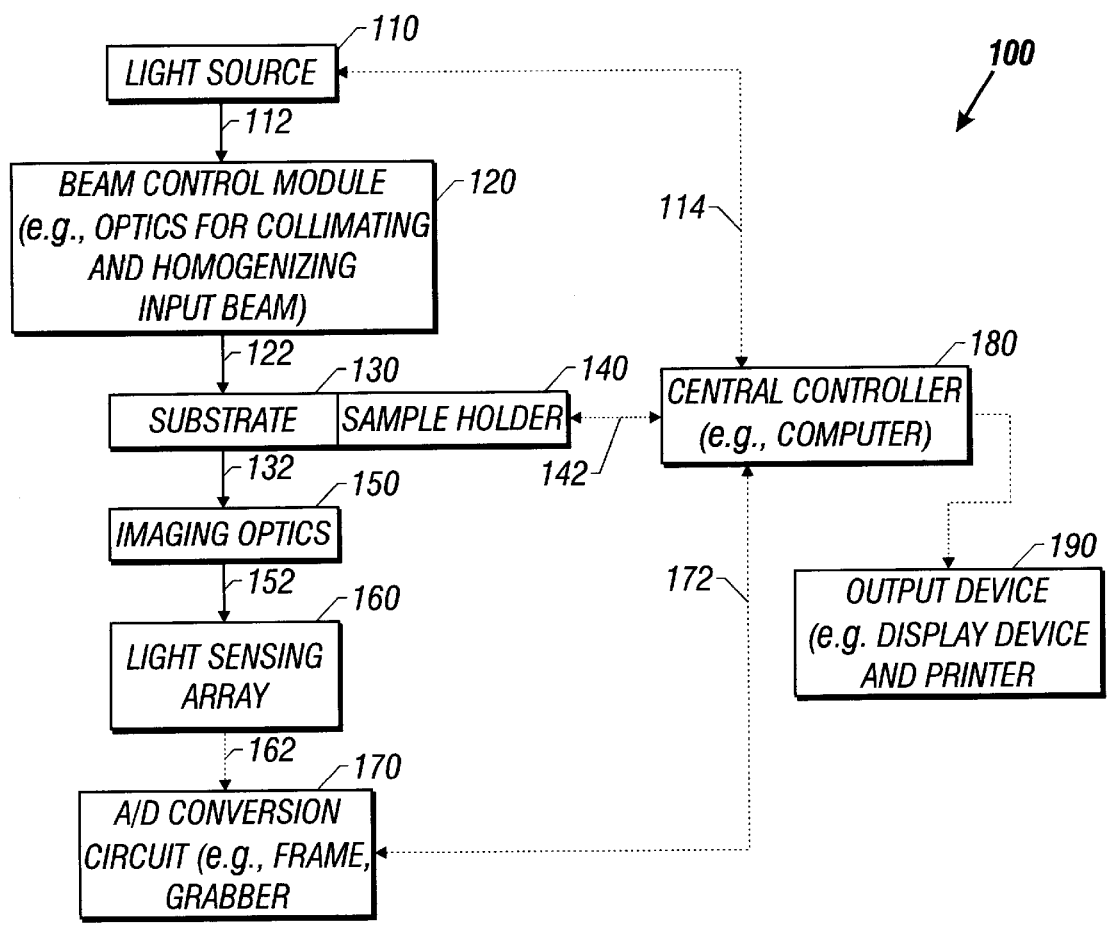
FIG. 1 is a block diagram showing functional blocks of an optical system for inspecting and measuring a substrate according to one embodiment of the invention. A solid line with an arrow represents an optical path and a dashed line represents an electrical path.

FIG. 1 shows one embodiment 100 of a system for inspecting and measuring a semiconductor substrate 130 based on optical absorption. The substrate 130 has a first surface and a second opposite surface which are substantially smooth to reduce scattering. Certain features of the system 100 are disclosed in the U.S. patent application Ser. No. 08/960,301 and U.S. Pat. No. 5,754,294, which are incorporated herein by reference.

A radiation source, e.g., a light source 110 produces a monochromatic optical beam 112 of a selected wavelength at which the substrate 110 is partially transparent. The light source 110 may be operable to produce monochromatic light at two or more selected wavelengths. A beam control module 120 is located relative to the light source 110 and modifies the beam 112 (e.g., beam profile and phase) to produce a collimated or nearly collimated beam 122 that is preferably incoherent. An adjustable sample stage 140 holds the substrate 130 at a desired position relative to the beam 122. A sample holder 140 is formed or engaged to a sample stage (not shown) to support the substrate 130 and is configured to allow for transmission of the beam 122, i.e., a transmitted beam 132, through the substrate 130.

The intensity distribution of the transmitted beam 132 includes information on light absorption by the substrate 130, which can be measured by using a light sensing array 160 and processed to extract thickness information of the substrate 130. In this context, the transmitted beam 132 is said to have an "image" of the substrate 130, since the degree of intensity attenuation of the beam 122 with reference to the intensity of the beam 112 at one sensing pixel in the array 160 is directly related to the absolute thickness of a small area on the substrate 130 that is directly imaged onto that pixel. Therefore, the readout from the sensing array 160 is a direct pixel-by-pixel mapping of the thickness variation of the substrate 130 within an area illuminated by the beam 122. A calibration can be performed to transform this thickness variation mapping into an absolute thickness mapping. This aspect of the invention can be further used to view and measure features formed on the substrate 130.

Imaging optics 150 is disposed relative to the substrate 130 and the sample holder 140 on an opposite side to the beam control module 120 to receive the transmitted beam 132. The beam 132 is modified by the imaging optics 150 to form a beam 152. The light sensing array 160 has a plurality of light-sensing pixels forming an array and is positioned relative to the imaging optics 150 to convert the intensity profile of the beam 152 into an electrical image in form of an analog electrical signal 162. An analog-to-digital conversion circuit 170, such as a frame grabber, converts the analog signal 162 into a digital signal 172.

A central controller 180 is configured to include a microprocessor and hardware interfaces for controlling the system and processing data. An electrical link 114 may be established between the light source 110 and the controller 180 to control the beam properties (e.g., intensity and wavelength) of the beam 112. Another electrical link 142 between the sample stage and the controller 180 can be used to measure and control the position of the sample holder 140 with respect to a predetermined position reference so that the substrate 130 can be placed at a desired position that is registered relative to the light sensing array 160. Such position information is sent to the controller 180 for signal processing. The digital signal 172 from the analog-to-digital conversion circuit 170 is also sent to the controller 180 and is processed to extract the thickness information of the substrate 130. An output device 190, which may include a display, a printer, or an external memory unit, is connected to the central controller 180 to output the thickness information and/or digital images of the substrate 130.

In operation, the thickness at a point within the illuminated area on the substrate 130 by the beam 122 is correlated to the amount of intensity attenuation by light absorption at that point. For a given semiconductor composition, the relation between the substrate thickness and the light absorption is monotonic but not necessarily linear. One way to determine the light absorption at a position on the substrate 130 is to compare measured intensity values of the transmitted beam 132 with the substrate in the path of the beam 122 to the measured intensity values of the transmitted beam obtained from placing substrate standards of known thickness values in the light path. The substrate standards are formed of the same semiconductor material as the substrates to be measured. The relation between the measured transmitted intensity values from the substrate standards and the known thickness values for a given input intensity at a given wavelength is used to determine the actual thickness of a substrate under measurement.

In general, a polynomial expansion may be used to represent this relation between the substrate thickness and the light absorption. The coefficients of the expansion for a given semiconductor composition at a selected wavelength can be determined by absorption measurements ("sample data points") of substrate standards with known thickness values at one or more selected wavelengths. The highest order of the polynomial expansion may be chosen to meet a desired precision requirement. Special care must be taken to ensure that the polynomial expansion is monotonic between different sample data points. The precision of the polynomial expansion may be improved by increasing the number of sample data points. The expansion coefficients can be stored in a memory unit of the central controller 180 for automated data processing.

For a given light sensing array 160, the dynamic range of the light-sensing pixels is limited, i.e., the noise of the light-sensing pixels sets a minimum detectable intensity level for an acceptable minimum signal-to-noise ratio. The saturation of the light-sensing pixels sets a maximum detectable intensity level. Thus, the intensity range of the transmitted beam 152 (or equivalently, the beam 132) should be commensurate with the dynamic range of the light sensing array 160. In addition, the light intensity and the wavelength of the beam 112 should be chosen in such a way that the thickness variation of a substrate can produce sufficient intensity variation in the transmitted beam 152 or 132 to achieve a desired image contrast in the electrical signal 162. This may be accomplished in a number of ways.

In one implementation, the light source 110 may be configured to produce light at a fixed wavelength with an adjustable intensity. When thin substrates are measured, the output intensity of the light source 110 is reduced to a relatively low level so that the intensity of the beam 152 is within a desired range. Conversely, the output intensity of the light source 110 is increased to a relatively high level when thick substrates are measured. The image contrast is adjusted by setting the fixed wavelength at a proper wavelength which is chosen to measure a specified range of thickness values. Once the wavelength is selected, any number of intensities can be used to cover some range of wafer thickness. However, there is a specific polynomial transfer function to extract thickness data from signal intensity for each laser intensity or power.

Alternatively, the wavelength of the output beam 112 from the light source 110 may be varied to accommodate the dynamic range of the light sensing array when measuring substrates with different thickness ranges. In this implementation, the intensity of the beam 112 may remain constant or may only change within a relatively small range. The wavelength of the beam 112 within a selected intensity range can be tuned toward or near an absorption line of a given semiconductor composition to increase the light absorption when thin substrates are measured. Conversely, the wavelength of the beam 112 can be tuned away from the absorption line to reduce the light absorption when thick substrates are measured. For example, a wavelength in the visible spectrum from about 400 nm to about 750 nm (e.g., near 700 nm) may be used to measure Si substrates with thickness down to or thinner than 1 μm and a wavelength in the IR spectrum for wavelengths longer than about 750 nm (e.g., near 900 nm) may be used to measure Si substrates with thickness up to or greater than 1000 μm. The light source 110 may include two or more light-emitting devices at different wavelengths or may include a wavelength-tunable light-emitting device.

Effects other than light absorption may also affect the intensity of the transmitted beam 132 or 152 such as reflection by surfaces of the substrate 130 and interference of the reflected beams. These effects are undesirable since they adversely affect the accuracy of the measurements based on absorption.

Contribution to the light attenuation from the surface reflection can be substantially reduced by calibrating the measurements using a substrate standard with a known thickness value. The light attenuation of the substrate standard can be measured by measuring the transmitted intensity of a probe beam at a given intensity and a given wavelength. This measured light attenuation corresponds to the thickness of the substrate standard.

The interference effect occurs when the light 122 is coherent or partially coherent. This may be caused by, for example, using a laser to produce the beam 112 or spatial filtering of the beam 112 by using a pin hole. The interference produces fringes in the intensity profile in the transmitted beam 132 or 152 that do not indicate the light absorption by thickness variation of a substrate. One way to reduce the interference effect is using an incoherent light source such that the phase of the wavefront of the beam 122 is random. Another way is to implement a phase scrambling element in the beam control module 120 to intentionally scramble the phase of the beam 112 so that the beam 122 is essentially incoherent. However implemented, the beam 122 is preferably incoherent and well-collimated, and has an intensity as uniform as possible.

The cross section of the beam 122 should be large enough to cover an area of interest on the substrate 130. In many practical implementations, the beam control module 120 is configured to expand and collimate the beam 112.

The imaging optics 150 may include a lens or a lens assembly to project an image of the substrate 130 onto the light sensing array 160. The image optics 150 is configured and positioned relative to the substrate 130 and the light sensing array 160 in such a way that the projected image of the illuminated area of the substrate 130 can be either magnified or reduced as desired. The light sensing array 160 may be formed of any light sensing pixels (e.g., CCDs or photodiodes) that are responsive to radiation at the wavelength of the beam 112.

Figure 2:
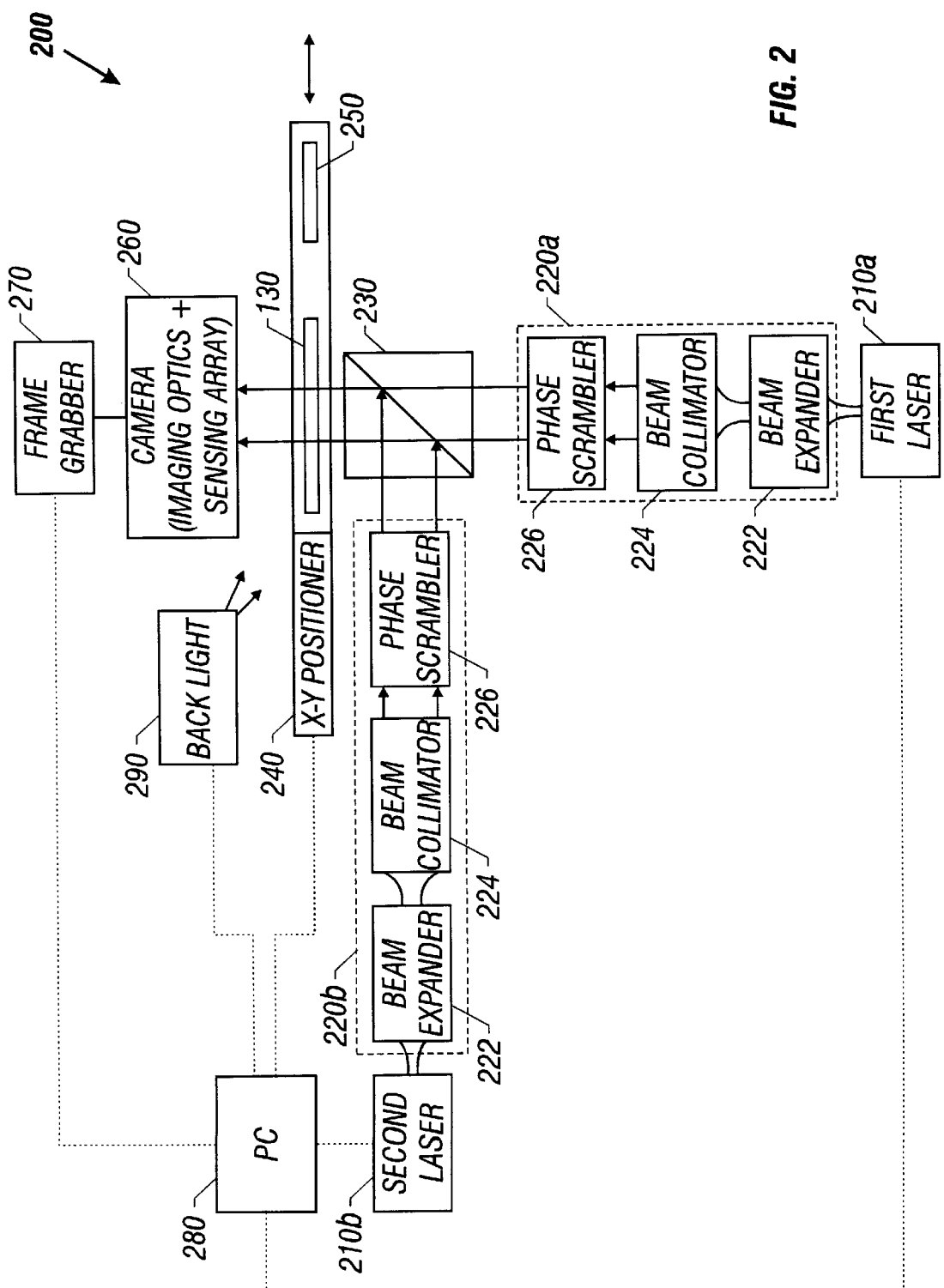
FIG. 2 is a block diagram showing one implementation of the system shown in FIG. 1.

FIG. 2 shows one implementation 200 of the system 100 in FIG. 1. Two lasers 210a and 210b are used to produce probe beams at two different selected wavelengths for measuring substrates of two different thickness ranges, e.g., from 0 to 200 μm, and from 190 μm to 1000 μm. Preferably, the two different thickness ranges overlap with each other in a small common thickness range such that the measurable thickness range of the system 200 is continuous throughout the two different ranges. The output beam from each laser is modified by a beam control module (220a or 220b) to produce an incoherent, expanded, and collimated probe beam to the substrate 130. Each beam control module (220a or 220b) includes a beam expander 222, a beam collimator 224, and a phase scrambler 226. One embodiment of the phase scrambler 226 includes a rotating diffuser formed of a transparent and slightly diffusive plastic disk mounted on a rotor. A beam splitter 230 is used to transmit a first probe beam from the laser 210a and direct a second probe beam from the laser 210b to the substrate 130.

A translational positioner 240 (e.g., a X-Y stage) is implemented to hold the substrate 130 under inspection. A substrate standard 250 may also be placed on the positioner 240 for calibration and can be moved in and out of the optical path as desired. The positioner 240 can be controlled to place either the substrate 130 or the substrate standard 250 in the path of a probe beam. A camera 260 is disposed relative to the positioner 240 to measure the intensity distribution of the transmitted probe beam. The camera 260 can include imaging optics and a light sensing array such as CCD. A frame grabber 270 is connected to the camera 260 and converts the analog output signal from the camera 260 into digital form for further processing. Alternatively, the camera 260 and the frame grabber 270 can be replaced by a digital camera having an imaging array (e.g., CCD) and an analog-to-digital converter.

A personal computer 280 is used to function as the central controller 180 in the system 100 of FIG. 1. Lasers 210a, 210b and the positioner 240 can be connected to and controlled by the computer 280. The computer 280 is also programmed to perform data processing and calibration as described below in detail.

The system 200 may further include a backlight 290 to illuminate the substrate 130 for substrate inspection. The lasers 210a, 210b may be turned off when the back light 290 is on. The reflected light or transmitted light from the substrate 130 caused by illumination of the back light 290 is collected by the camera 260. The computer 280 processes the data to produce an image of the substrate for inspection. Since absolute thickness may not be measured during an inspection, data calibration may be unnecessary. This feature can be used to quickly inspect the surface quality of the substrate under measurement for defects such as scratches before measuring the absorption of the substrate using the lasers. Alternatively, this feature can be implemented by using light from one of the lasers 210a and 210b.

All optical elements in the system 200 may also be enclosed in a dark compartment to reduce background noise.

2. Signal Processing

The wavelength of a probe beam is so selected that the material of a substrate under test is partially absorbing. The amount of absorption increases with the thickness of substrate. This forms the basis of thickness measurements. In general, the dependence of an amount of absorption on the substrate thickness is nonlinear. Hence, the light intensity of the transmitted probe beam through a substrate is usually associated with the absolute substrate thickness by a nonlinear relation. This is at least in part due to the nonlinear nature inherent in the optical absorption and in part due to the other effects such as light scattering in the substrate material.

A polynomial fitting can be used to establish a definite nonlinear relation between the light attenuation and the substrate thickness for a given wavelength and power level of the probe beam. The coefficients of the polynomial fitting can be obtained by intensity measurements of the transmitted probe beam of various substrate standards with known thickness values. Such coefficients are generally dependent on wavelength and intensity of the probe beam and the properties of the substrate material.

The absolute thickness of a set of substrate standards may be measured by averaging the data obtained from several industrial standard techniques. One may choose such measuring techniques as spectrophotometer (e.g., Cary 5E UV-Vis-NIR), mechanical micrometers, capacitance probes (e.g., ADE Gage), sound wave detection (e.g., Sonogage 300) and others. The accuracy of absolute thickness of the substrate standards can be improved by both using multiple measurements and averaging the thickness values of a substrate standard obtained from different techniques.

Calibration of a system shown in FIGS. 1 or 2 can be accomplished by placing the substrate standards one at a time on the sampler holder to measure output data from the sensing array. The relation of the output signal S and the substrate thickness t can be expressed in a polynomial form:

$$S = \alpha + \beta t + \gamma t^2 + \quad (1)$$

where $\alpha$, $\beta$, $\gamma$, etc. are the expansion coefficients and are in general dependent on various factors including the substrate material properties, the surface characteristics, the wavelength and the intensity of the input beam. The above polynomial equation may be rewritten as a function of S since S monotonically decays with t:

$$t = a + bS + cS^2 + \quad (2)$$

where coefficients a, b, c, etc. are for determining t from S and are also dependent on factors such as the substrate material properties, the surface characteristics, the wavelength and the intensity of the input beam. The coefficients a, b, c, etc. can be determined by first measuring the signal level S for a number of substrates of known thickness values, t, and then determining the coefficients by using a linear regression fitting technique. Two or more such polynomial formulae at different wavelengths and/or different probe beam intensities can be obtained in order to cover a desired measuring range for a sensing array with a given dynamic range of the sensing array.

For example, two lasers respectively at 700 nm and 900 nm may be used to cover a thickness range from about 10 $\mu$m to about 500 $\mu$m. The range from 10 $\mu$m to 110 $\mu$m may be covered by four output power levels from the first laser at 700 nm and the range from 100 $\mu$m to 500 $\mu$m may be covered by four output power levels from the second laser at 900 nm. For each laser output power and wavelength, a proper set of polynomial coefficients can be determined by recording S for different substrates with known thickness values. Hence, a total of 8 sets of polynomial fitting coefficients can be obtained.

Assume all sensing pixels are identical, then the thickness $t_{ij}$ of point on a substrate under measurement corresponding to the pixel at ith row and jth column is related to the output signal $S_{ij}$ from that pixel by:

$$t_{ij} = a + bS_{ij} + cS^2_{ij} + \quad (3)$$

Thus, for an intensity distribution $S_{ij}$, a corresponding thickness map $t_{ij}$ can be obtained. The computer in the control module can be programmed to use the Equation (3) to produce a graphic representation of the thickness map $t_{ij}$ of the substrate.

The raw intensity data from the sensing pixels need to be processed by multiple data processing techniques before they can be used to produce the thickness map $t_{ij}$. Such processing significantly reduces noise in the raw data and improves image contrast and resolution of the thickness map $t_{ij}$.

Figure 3:
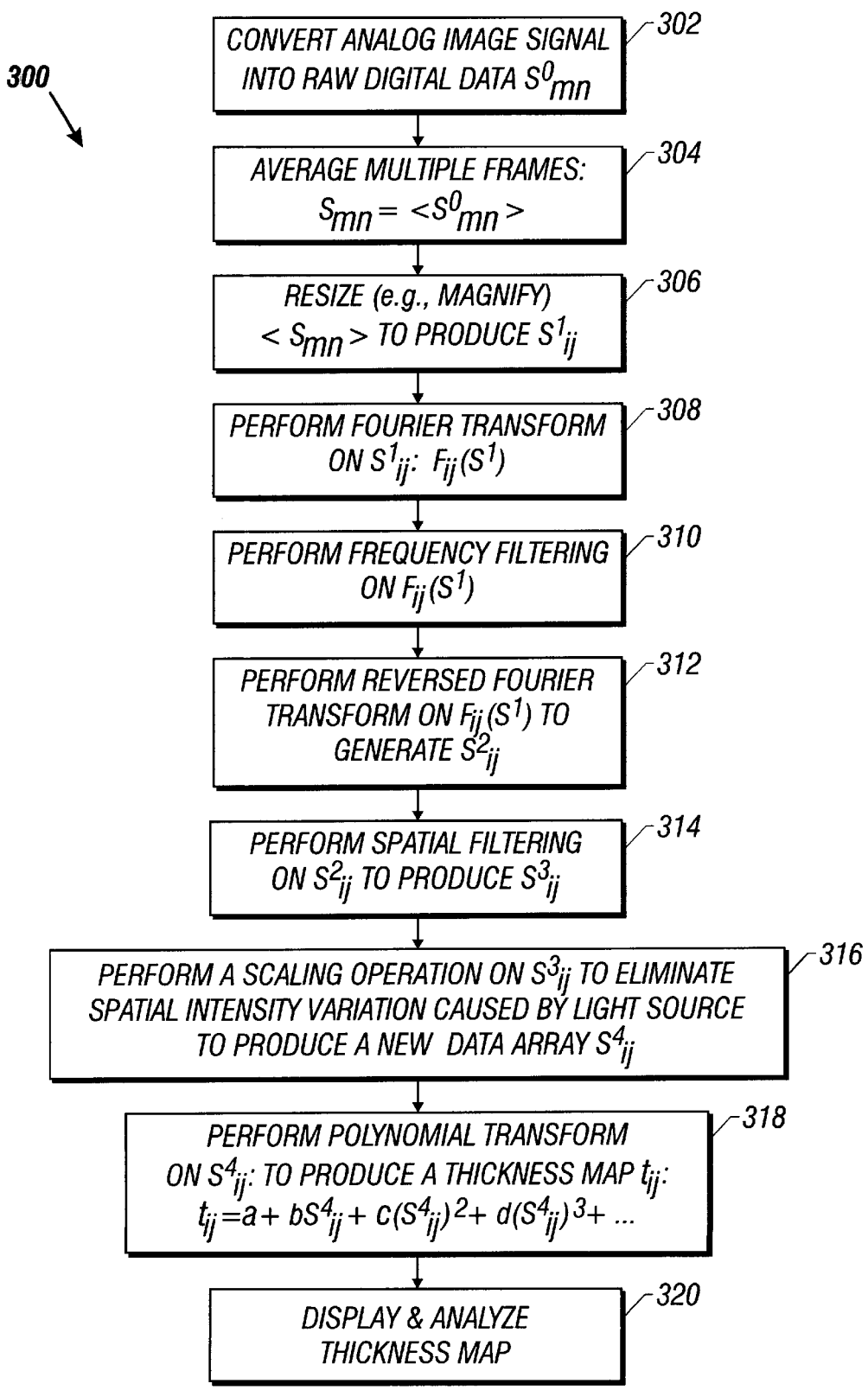
FIG. 3 is a flowchart showing an exemplary procedure of digital signal processing of data measured by the system shown in FIG. 1.

FIG. 3 is a flowchart 300 showing one implementation of data processing. At step 302, raw digital data $S^o_{mn}$ produced by the sensing pixel at mth row and nth column is obtained by converting the analog data indicating the transmitted intensity of a location on a substrate that is imaged to the sensing pixel at (m, n). At step 304, multiple frames are captured and averaged to produce an average $S_{mn} = \langle S^o_{mn} \rangle$ with reduced noise. This substantially eliminates unwanted artifacts in the thickness data caused by time variations and noise from various sources including the light source, camera, and collection optics. At step 306, the data $S^o_{mn}$ is resized to a desired size to produce data $S^1_{ij}$. For example, a data array $S_{mn}$ of 512×512 elements may be enlarged to a data array $S^1_{ij}$ of 1024×1024 by data interpolation for convenience of inspecting the associated thickness map.

Next, digital filtering can be applied to the data to further reduce the noise or to improve the image quality. At step 308, a fast Fourier transform is performed on data $S^1_{ij}$ to produce data $F_{ij}(S^1)$ in frequency domain. A digital filter is applied to $F_{ij}(S^1)$ to eliminate unwanted frequency components at step 310. At step 312, the filtered data $F'_{ij}(S^1)$ in frequency domain is transformed back to spatial domain as data $S^2_{ij}$. This process is used to selectively filter or eliminate spatial variations of a particular spatial frequency from any location in the image. Certain spikes and low frequency variation (e.g., drift) in the image, which can produce unwanted artifacts in the image data, can be substantially reduced in this filtering process in the frequency domain.

Next at step 314, a spatial filtering is applied to the data $S^2_{ij}$ to eliminate unwanted spatial components. Such spatial filtering can be done, for example, by assigning each pixel in the image a new value which is related to the values of its neighboring pixels prior to the filtering. One simple filtering is assigning a new value to a pixel by averaging values of this pixel and its directly adjacent pixels. This process results in spatially filtered data $S^3_{ij}$. Unwanted artifacts caused by, e.g., spatial noise caused by the light source, camera, beam shaping optics, and diffraction and interference effects from a patterned substrate can be substantially reduced.

One factor that can adversely affect the accuracy of the thickness map is the spatial intensity variation of the input probe beam. For example, the probe beam may have a Gaussian profile, a typical spatial variation in many lasers. An intensity scaling step may hence be performed to correct this intensity variation at step 316 so that the data represents measurements under a uniform illumination. This produces a scaled image data $S^4_{ij}$.

At step 318, the scaled data $S^4_{ij}$ is used to produce a thickness map of the illuminated area on the substrate according to the polynomial formula in Equation (3):

$$t_{ij} = a + bS^4_{ij} + c(S^4_{ij})^2 + \quad (4)$$

where the coefficients a, b, c, etc. are obtained by including the normalization effect. This thickness map has the thickness and feature information for further analysis or substrate inspection which is done at step 320.

Figure 4:
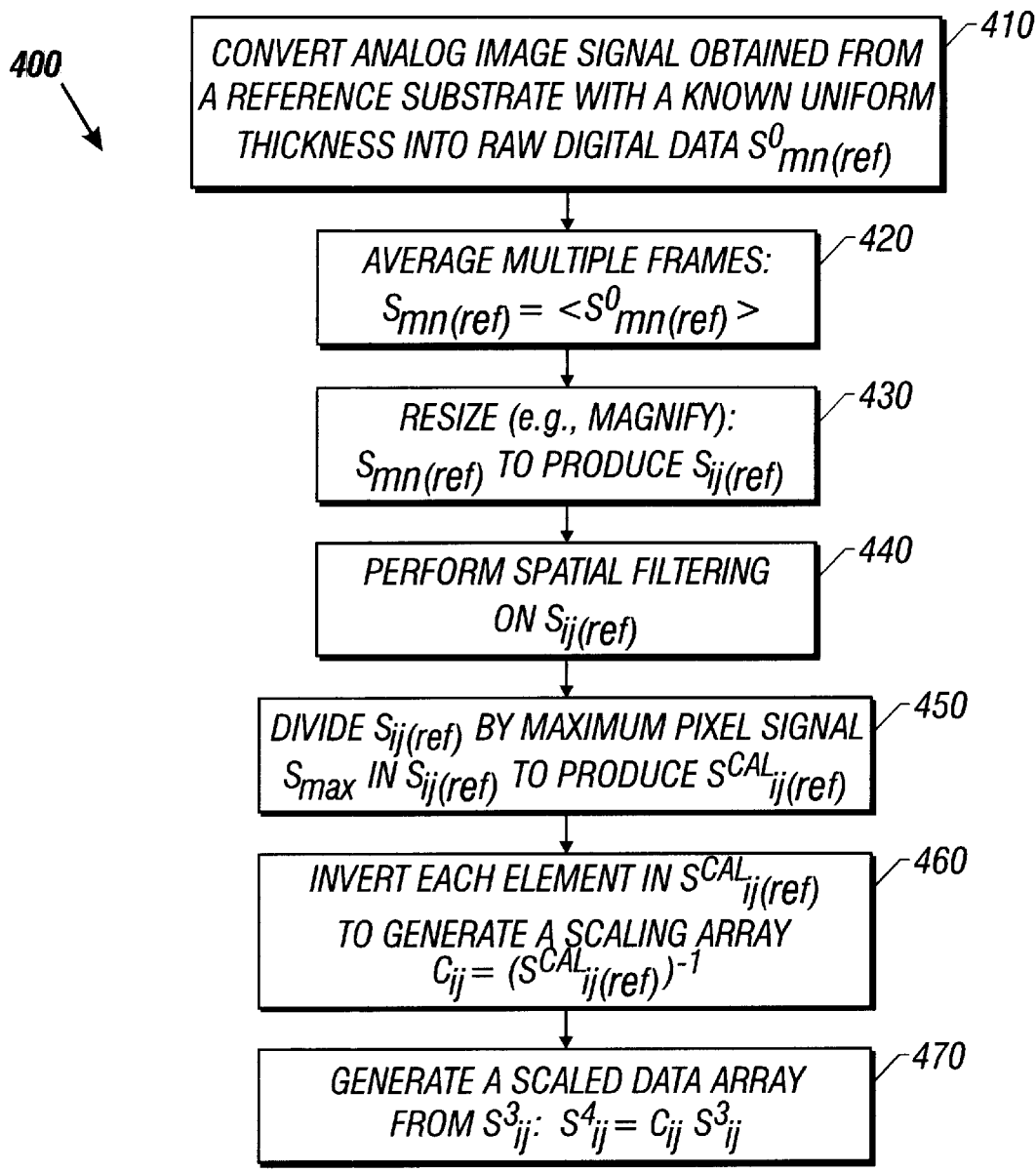
FIG. 4 is a flowchart showing an exemplary procedure for removing intensity variation of an optical beam across a substrate under measurement.

FIG. 4 further shows one implementation of the scaling step 316. At step 410, a reference substrate with a known thickness (preferably uniform) is used to generate raw digital data $S^o_{mn(ref)}$. Multiple frames are captured and averaged to produce $S_{mn(ref)}=\langle S^o_{mn(ref)}\rangle$ at step 420. The data $S_{mn(ref)}$ is scaled to $S_{ij(ref)}$ at step 430. Next at step 440, a spatial filtering is performed on $S_{ij(ref)}$ to substantially eliminate the spatial noise. Each pixel value in $S_{ij(ref)}$ is then divided by the maximum pixel signal $S_{max}$ to produce a scaled data array $S^{cal}_{ij(ref)}=S^1_{ij}/S_{max}$ (step 450). At step 460, a scaling array $C_{ij}$ is generated: $C_{ij}=1/S^{cal}_{ij}$. Then at step 470, the data array $S^3_{ij}$ of a substrate under test from the step 314 in FIG. 3 is scaled with the array $C_{ij}$: $S^4_{ij}=C_{ij}S^3_{ij}$.

In general, the sequence of the processing shown in the flowchart 300 of FIG. 3 may be changed as desired in different implementations. In addition, certain processes, e.g., the step 306 for resizing an image, may be eliminated in certain applications to reduce the processing time. However, the scaling step 316 is usually desirable since spatial variation in the input intensity can lead to false thickness values.

3. System Operation

Two or more wavelengths and different laser power levels at each wavelength may be used to measure the thickness variation or features formed in a substrate. Since each calibration polynomial fitting is only intended for a given wavelength and a given power level, corresponding valid thickness values are limited to a range. For thickness values outside the calibration range, a different power level and/or a different wavelength may be needed.

Figure 5:
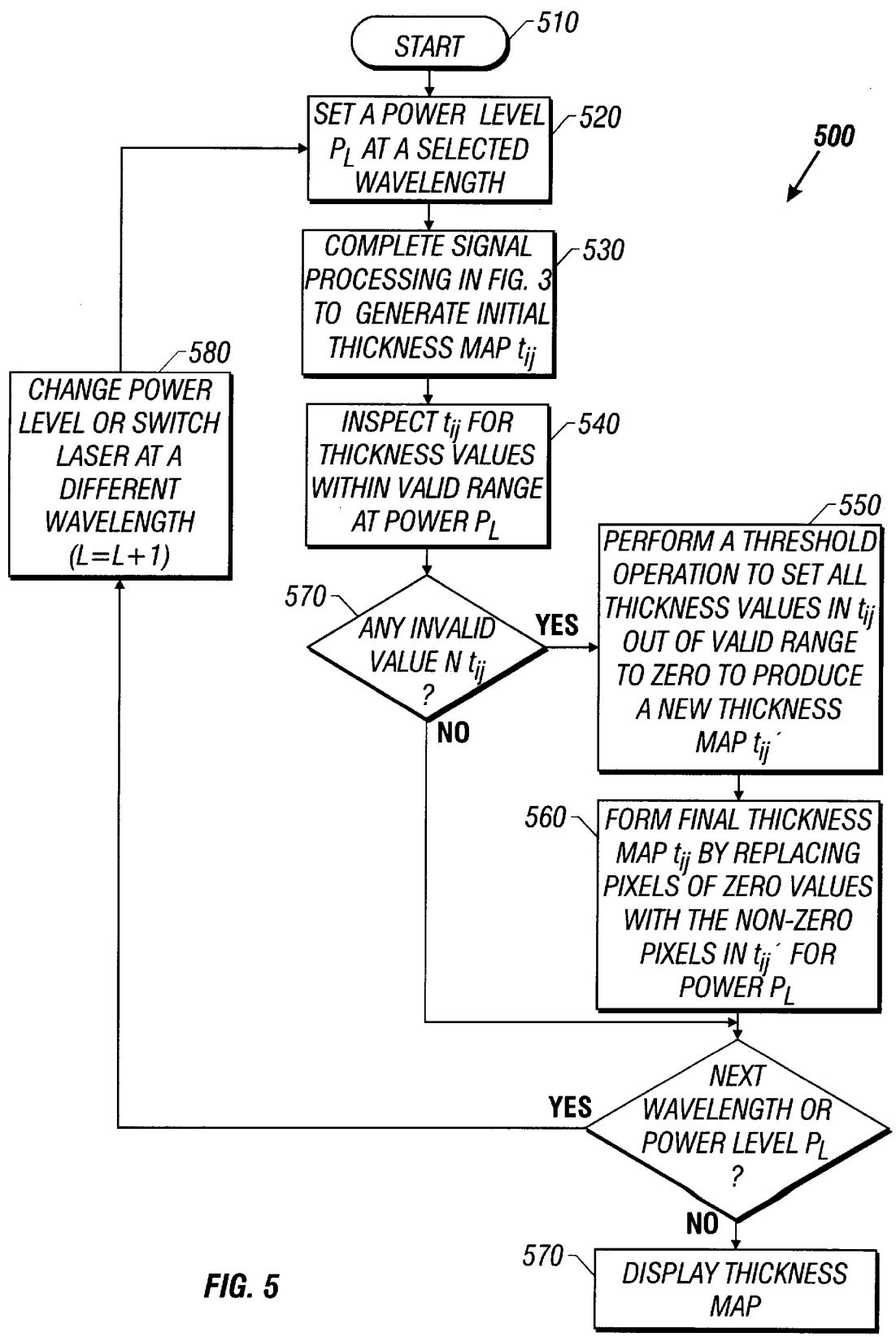
FIG. 5 is a flowchart showing one operation process of the system shown in FIGS. 1 or 2.

FIG. 5 shows one operation flow 500 for measuring characteristics of a substrate. At step 510, measurement of a substrate is initiated by properly placing the substrate in the sample stage and setting all values in a thickness map to zero ($T_{ij}=0$). At step 520, a light source is adjusted to produce a probe beam at a first wavelength and a first power level. For example, the power may be set at a desired maximum value. At step 530, the signal processing shown in FIG. 3 is performed to obtain an initial thickness map of the substrate. Next at step 540, the values in the initial thickness map are inspected to determine if there is any invalid value for the first wavelength and first power level. This can be done by the control computer.

If there is at least one invalid thickness value, a threshold operation in step 550 is performed to set the invalid values to zero or other symbols for indicating the invalidity to produce a intermediate thickness map. Next at step 560, a first thickness map is produced by keeping only the valid values in the intermediate thickness map and setting the pixels with invalid values to zero. Then, another power level or wavelength may be selected (step 580) to repeat the processes until all values are valid or the thickness map can be displayed (step 570).

If all values are valid after step 540, the thickness map may be displayed or the step 580 may be performed to improve the image quality (e.g., contrast) of the thickness map by using a different wavelength and or a different power level.

The acceptable thickness range for each calibrated laser power or wavelength overlaps the range of the adjacent setting of laser power or wavelength. After the final laser power is used to probe the wafer, the $T_{ij}$ array is complete and contains all the thickness results. This allows for evaluation of wafer thickness over a broad range of thicknesses, for example, from 10 $\mu$m–1000 $\mu$m.

Once the system is calibrated such that the scaling matrix and polynomial thickness transfer function are determined for each wavelength and power, it usually not necessary to use calibration standards or reference wafers during normal operation. The standards may be periodically used to calibrate the system. The reference substrate 250 shown in FIG. 2 may also be used for system self check to insure that the total system operation is normal. If a laser, phase scrambler, camera, or other component fails, the system can identify this problem by completing a self check routine against the reference wafer 250.

The control computer may be programmed by using any suitable program language. One example is the commercial software LabView or a similar high level programming language that offers existing software modules for all the control, data acquisition, digital signal processing, and user interface functions. Hence, only the software connecting the modules and defining the described signal processing needs to be developed. This allows the system to be easily re-programmed and calibrated for numerous different types of substrates and applications without variation of the hardware module.

A user-friendly interface can be implemented to facilitate the operation of the system. A display device and one or more input devices (e.g., a keyboard, a mouse, etc.) may be used to control the data processing and to view the thickness map. The user interface can be configured in such a way that an operator can request the thickness map and thickness data for each location on the wafer that is selected prior to analysis.

The thickness maps are stored to a memory device and can be recalled at any time by inputting the appropriate identification number or command.

The operator can also request visual inspection of the wafer surface. Referring to FIG. 2, when such an inspection is needed, the lasers 210a, 210b are turned off and the back light 290 is turned on to illuminate a selected substrate area. Alternatively, light from one of the lasers 210a, 210b can be directed to illuminate the selected area. The reflected light off the wafer surface is then collected and processed to produce an image of the illuminated substrate area so that the operator can inspect the wafer for scratches, pits, and other surface defects. In this inspection mode, certain processing steps in FIG. 3 may be neglected.

Figure 6:
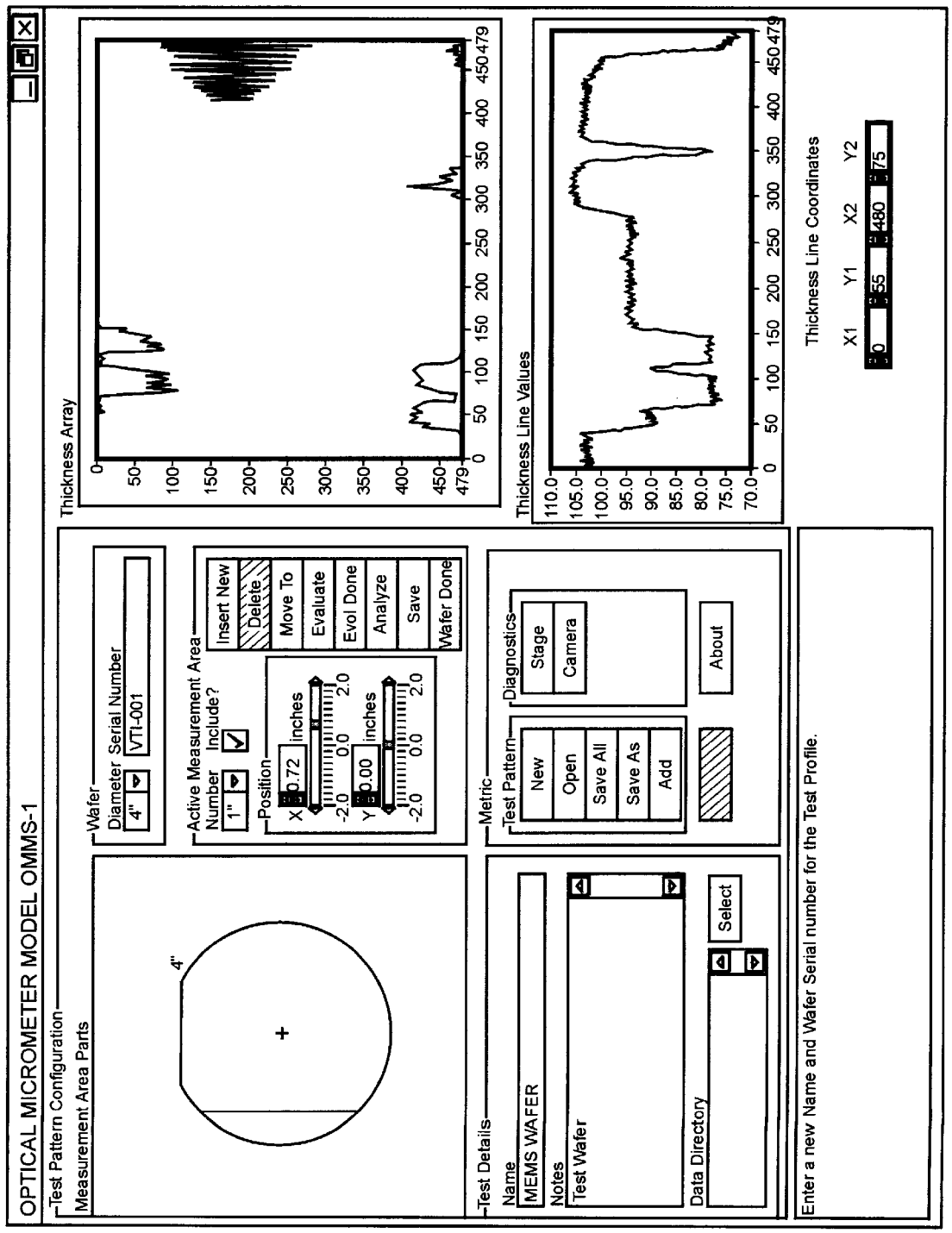
FIG. 6 is a diagram illustrating a user interface for the control computer in a system of FIG. 1 or FIG. 2.

FIG. 6 shows an exemplary user interface. Three display windows are included, a selection window for selecting a substrate and areas of interest, a map display window for showing the image or thickness map of a selected area on a substrate, and an optional display window for showing thickness variation along a selected line direction.

Although the present invention has been described in detail with reference to a number of particular embodiments, various modifications and enhancements may be made without departing from the spirit and scope of the invention as defined in the following claims.

What is claimed is:

1. A system for characterizing a partially transparent substrate by using electromagnetic radiation, comprising:

a sample holder having a support surface operable to support a substrate which has a first surface and a second opposite surface;

a radiation source, disposed relative to said sample holder and configured to produce a first substantially monochromatic probe beam at a first discrete wavelength to illuminate the first surface of the substrate, wherein said first discrete wavelength is one at which said probe beam is partially absorbed by the substrate and partially passes through the substrate as a transmitted probe beam;

a sensing array configured to have a plurality of sensing pixels and disposed relative to said sample holder to receive said transmitted probe beam, said sensing array operable to produce an electrical signal indicative of an intensity distribution of said transmitted probe beam;

an analog-to-digital converting device, connected to said sensing array and configured to convert said electrical signal into a digital data array corresponding to said intensity distribution of said transmitted probe beam; and an electronic processing device, connected to said analog-to-digital converting device to receive said digital data array and configured to determine an amount of attenuation by said substrate at said first discrete wavelength to produce a thickness map of the substrate, wherein said electronic processing device is programmed to digitally remove noise and selected signal components from said digital data array to improve a quality of said thickness map.

2. A system as in claim 1, wherein said electronic processing device is configured to have a first set of predetermined and calibrated absorption-thickness data of radiation absorption at said first discrete wavelength as a function of thickness of a first set of substrate standards that are made of the same semiconductor material as the substrate, wherein each of said first set of substrate standards has a different thickness value within a first thickness range and said thickness map of the substrate is determined based on said absorption-thickness data.

3. A system as in claim 2, wherein:

said radiation source is operable to produce a second substantially monochromatic probe beam at a second discrete wavelength; and said electronic processing device is configured to have a second set of predetermined and calibrated absorption-thickness data of radiation absorption at said second discrete wavelength as a function of thickness of a second set of substrate standards that are made of the same semiconductor material as the substrate, each of said set of substrate standards having a different thickness value within a second thickness range which partially overlaps with said first thickness range.

4. A system as in claim 3, wherein said first discrete wavelength is within the visible spectral range and said second discrete wavelength is within the IR spectral range.

5. A system as in claim 5, wherein said sensing array includes a CCD array.

6. A system as in claim 1, wherein said radiation source is a laser and further comprising a phase-scrambling device disposed between said laser and said substrate to randomize a phase of said probe beam.

7. A system as in claim 1, wherein said electronic processing device is programmed to perform at least one of the following digital signal processing operations:

(1) a frequency filtering operation in which said digital data array is transformed into the frequency domain, and one or more selected frequency components are deleted;

(2) a spatial filtering operation in which each pixel of said digital data array is assigned a new pixel value that is associated with values of a plurality of adjacent pixels prior to said spatial filtering; or (3) a scaling operation in which a variation in said digital data array caused by an intensity variation in said probe beam is removed.

8. A system as in claim 7, wherein said electronic processing device is further programmed to produce an average of a plurality of digital data arrays corresponding to different electrical signals produced at different times by said sensing array, thereby reducing noise.

9. A system as in claim 7, wherein said electronic processing device is further programmed to perform a resizing operation on said digital data array to produce a resized digital data array that has a different number of pixels than said digital data array.

10. A method for characterizing a partially transparent substrate by using electromagnetic radiation, comprising:

illuminating the substrate with a probe beam at a selected wavelength, wherein said selected wavelength is chosen in such a way that said probe beam is partially absorbed by the substrate and partially passes through the substrate as a transmitted probe beam;

measuring an intensity of said transmitted probe beam by using a sensing array of a plurality of sensing pixels to produce an electrical signal indicative of an intensity distribution of said transmitted probe beam;

converting said electrical signal into a digital data array corresponding to said intensity distribution;

determining an amount of attenuation by said substrate at said selected wavelength to produce a thickness map of the substrate by processing said digital data through at least one of the following operations:

(1) a frequency filtering operation in which said digital data array is transformed into a frequency domain and one or more selected frequency components are deleted;

(2) a spatial filtering operation in which each pixel of said digital data array is assigned a new pixel value that is associated with values of a plurality of adjacent pixels prior to said spatial filtering;

(3) a scaling operation in which a variation in said digital data array caused by an intensity variation in said probe beam is removed; or (4) producing an average of a plurality of digital data arrays corresponding to different electrical signals produced at different times by said sensing array, thereby reducing noise.

11. A method as in claim 10, further comprising:

obtaining a set of predetermined and calibrated absorption-thickness data of radiation absorption at said selected wavelength as a function of thickness of a set of substrate standards that are made of the same semiconductor material as the substrate, wherein each of said substrate standards has a different thickness value within a thickness range; and determining said thickness map of the substrate according to said set of absorption-thickness data.

12. A method as in claim 11, wherein said function is a polynomial function.

13. A method for characterizing a partially transparent substrate by using electromagnetic radiation, comprising:

illuminating the substrate with a probe beam at a first selected wavelength and a first power level, wherein said first selected wavelength is chosen in such a way that said probe beam is partially absorbed by the substrate and partially passes through the substrate as a transmitted probe beam;

measuring an intensity of said transmitted probe beam by using a sensing array of a plurality of sensing pixels to produce an electrical signal indicative of an intensity distribution of said transmitted probe beam;

determining an amount of attenuation by said substrate at said first selected wavelength and said first power level to produce a first thickness map of the substrate by processing said intensity of said transmitted probe beam according to first calibrated data of light attenuation and substrate thickness obtained at from a set of substrate standards of known thicknesses and formed of the same material as said substrate;

changing one of said first selected wavelength and said first power level to produce a second probe beam;

measuring a transmission intensity of said second probe beam through said substrate;

determining an amount of attenuation of said second probe beam by said substrate of to produce a second thickness map of the substrate by processing said transmission intensity according to second calibrated data of light attenuation and substrate thickness obtained from a set of substrate standards of known thicknesses and formed of the same material as said substrate; and producing a final thickness map for analysis by combining data from said first thickness map and said second thickness map.

14. A method as in claim 13, wherein said first and second thickness maps are produced by performing at least one of the following operations:

(1) a frequency filtering operation in which data on spatial intensity information is transformed into a frequency domain and one or more selected frequency components are deleted;

(2) a spatial filtering operation in which each pixel from said sensing array is assigned a new pixel value that is associated with values of a plurality of adjacent pixels prior to said spatial filtering;

(3) a scaling operation in which a variation in said digital data array caused by an intensity variation in said probe beam is removed; or (4) producing an average of a plurality of frames produced at different times by said sensing array, thereby reducing noise.

* * * * *